US012795608B2

(12) United States Patent
Kamalaraj et al.

(10) Patent No.: US 12,795,608 B2
(45) Date of Patent: Nov. 10, 2026

(54) AUTOMATIC TRACKING AREA IDENTITY LIST GENERATION IN AN ACCESS AND MOBILITY MANAGEMENT FUNCTION IN 5G DEPLOYMENTS

(71) Applicant: Cisco Technology, Inc., San Jose, CA (US)

(72) Inventors: Vinod Kamalaraj, Groton, MA (US); Dishant Parikh, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 18/318,165

(22) Filed: May 16, 2023

(65) Prior Publication Data

US 2024/0389072 A1 Nov. 21, 2024

(51) Int. Cl.
*H04W 68/06* (2009.01)
*H04W 48/08* (2009.01)

(52) U.S. Cl.
CPC ........... *H04W 68/06* (2013.01); *H04W 48/08* (2013.01)

(58) Field of Classification Search
CPC .............................. H04W 68/06; H04W 48/08
See application file for complete search history.

(56) References Cited

U.S. PATENT DOCUMENTS 11,323,944 B2 * 5/2022 Tripathi ................ H04W 24/10
2005/0054349 A1 * 3/2005 Balachandran ....... H04W 60/04 455/519
2011/0096731 A1 * 4/2011 Kamalaraj ............ H04W 48/18 370/329
2011/0098051 A1 * 4/2011 Kamalaraj .............. H04W 8/02 455/450
2012/0252451 A1 * 10/2012 Knauft .................... H04W 8/06 455/436
2013/0142122 A1 6/2013 Eipe et al.
2013/0183959 A1 7/2013 Mihaly et al.
2014/0024407 A1 * 1/2014 Yin ....................... H04W 68/04 455/515
2016/0183156 A1 * 6/2016 Chin ................... H04L 61/5007 370/331
2018/0063701 A1 * 3/2018 Jin ........................ H04W 24/02
(Continued)

FOREIGN PATENT DOCUMENTS

CN 107426810 B * 4/2022 ........ H04W 56/0005
EP 2396992 B1 * 8/2020 ...... H04W 36/00835
(Continued)

*Primary Examiner* — Sujoy K Kundu
*Assistant Examiner* — Vladislav Y Agureyev
(74) *Attorney, Agent, or Firm* — Polsinelli P.C.

(57) ABSTRACT

An access and mobility management function (AMF) of a 5G mobile network receives an uplink non-access stratum (NAS) transport message through a source gNB and that is associated with a user equipment (UE). From this message, the AMF identifies a tracking area identity (TAI) of a first tracking area. During a handover process associated with the UE, the AMF receives a new message that indicates a new TAI for the new tracking area the UE is entering. Using the TAI of the first tracking area and the TAI of the new tracking area, the AMF identifies a new tracking area adjacency. With this new tracking area adjacency, the AMF automatically updates TAI lists to incorporate the new tracking area adjacency.

18 Claims, 10 Drawing Sheets

(56) References Cited

U.S. PATENT DOCUMENTS

| | | | | |
|---|---|---|---|---|
| 2018/0220289 | A1 | 8/2018 | Ryu et al. | |
| 2019/0116486 | A1* | 4/2019 | Kim | H04W 8/10 |
| 2019/0132740 | A1* | 5/2019 | De | H04W 12/122 |
| 2019/0174449 | A1* | 6/2019 | Shan | H04W 60/04 |
| 2020/0059884 | A1 | 2/2020 | Chen et al. | |
| 2020/0120570 | A1* | 4/2020 | Youn | H04W 8/08 |
| 2020/0145886 | A1* | 5/2020 | Prasad | H04W 36/00835 |
| 2020/0213924 | A1* | 7/2020 | Dudda | H04W 36/30 |
| 2021/0368398 | A1* | 11/2021 | Sillanpaa | H04W 36/00222 |
| 2022/0007267 | A1* | 1/2022 | Maattanen | H04W 8/26 |
| 2022/0022155 | A1* | 1/2022 | Wang | G01S 5/0284 |
| 2022/0046490 | A1* | 2/2022 | Tripathi | H04W 36/0085 |
| 2022/0182896 | A1* | 6/2022 | Talebi Fard | H04W 36/0085 |
| 2022/0225265 | A1 | 7/2022 | Jeong et al. | |
| 2022/0345963 | A1* | 10/2022 | Casati | H04W 60/00 |
| 2023/0309046 | A1* | 9/2023 | Song | H04W 8/26 |
| 2024/0129793 | A1* | 4/2024 | Talebi Fard | H04W 48/06 |
| 2024/0276416 | A1* | 8/2024 | Kim | H04W 60/04 |
| 2024/0298253 | A1* | 9/2024 | Talebi Fard | H04W 48/18 |
| 2024/0414616 | A1* | 12/2024 | Lu | H04W 36/0058 |

FOREIGN PATENT DOCUMENTS

| | | | | |
|---|---|---|---|---|
| KR | 20230139354 | A * | 10/2023 | H04W 8/02 |
| WO | WO-2022125747 | A1 * | 6/2022 | H04W 76/27 |
| WO | WO-2023075655 | A1 * | 5/2023 | H04W 48/20 |

* cited by examiner

AUTOMATIC TRACKING AREA IDENTITY LIST GENERATION IN AN ACCESS AND MOBILITY MANAGEMENT FUNCTION IN 5G DEPLOYMENTS

TECHNICAL FIELD

The present disclosure generally relates to the field of computer networking, particularly with regard to the automatic generation of Tracking Area Identity (TAI) lists for User Equipment (UEs) within 5G mobile networks.

BACKGROUND

The proliferation of broadband cellular networks, such as 5G mobile networks, has led to an increase in network speed, reduced latency, and improved flexibility of wireless services. As a result, manufacturers of user equipment (UE), such as smartphones, laptop computers, tablets, and other wireless mobile devices, have implemented 5G functionality for these UE. For instance, these UE may be configured to detect 5G mobile networks and to engage in a registration procedure that is used to access different 5G nodes (gNBs) associated with these 5G mobile networks. During this registration procedure, a UE is assigned a Tracking Area Identity (TAI) list, which specifies the TAI that the UE can be present in without sending a mobility updating registration request to the Access and Mobility Management Function (AMF) of the 5G mobile network. The TAI list includes the TAI that are adjacent to the TAI that the UE is currently present in within the 5G mobile network.

The TAI list is often configured by the network operator of the 5G mobile network on to the AMF. This network operator may have knowledge of the gNBs and TAI layout within the 5G mobile network. However, the manual creation of the TAI list by the network operator can be tedious and, as a result, can often be prone to error. Further, as services move to an As A Service (AAS) model, the creation of TAI lists becomes more difficult. For instance, a network operator may be required to manually update the TAI list when new TAIs are added or when the network is updated or modified. These additional updates can result in further error.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
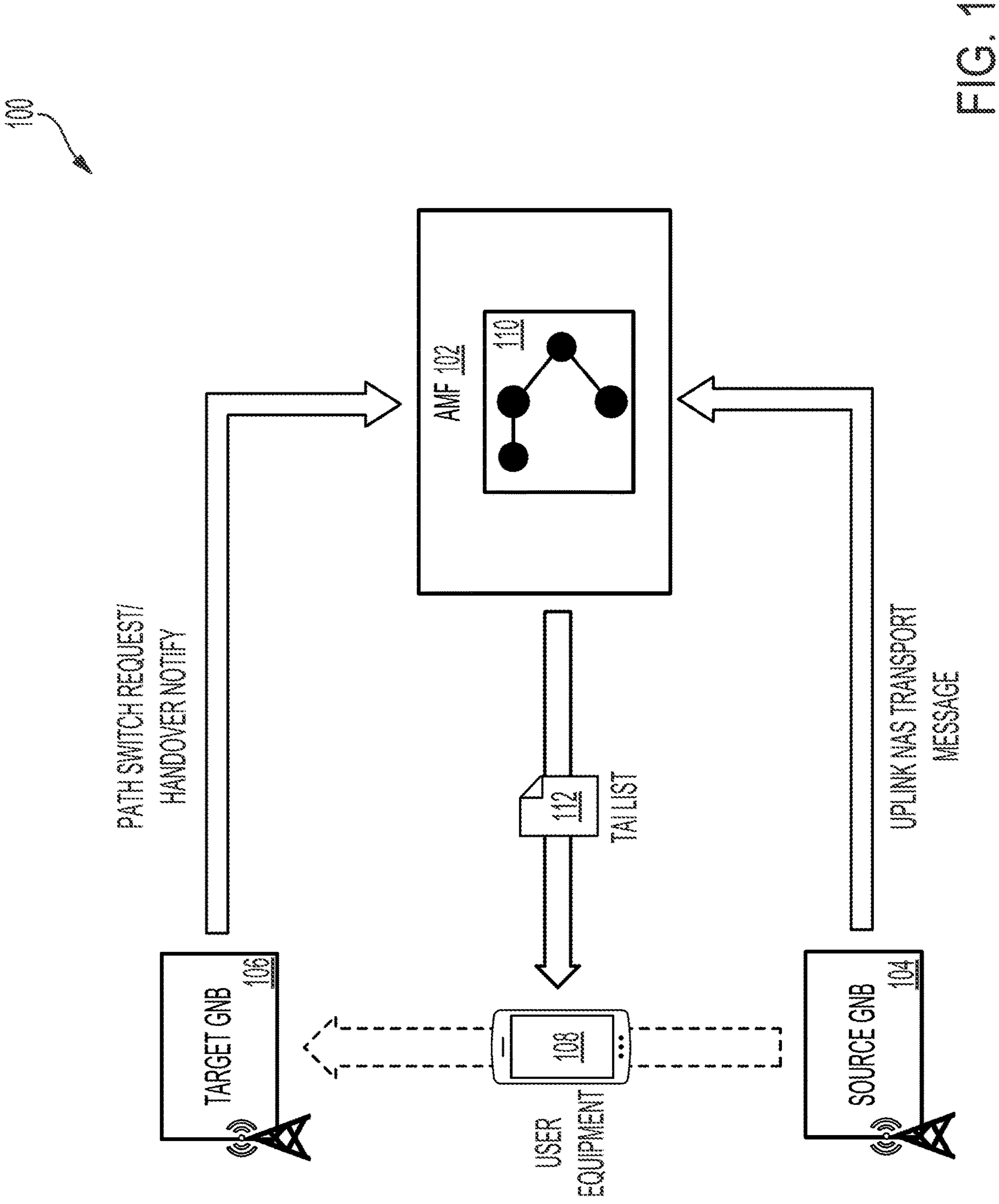
FIG. 1 shows an illustrative example of an environment in which an AMF associated with a 5G mobile network automatically determines TAI adjacencies based on handover signaling from source and target gNBs and uses the TAI adjacencies to automatically generate TAI lists in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods and computer-readable storage media for automatically generating TAI lists for UEs within 5G mobile networks based TAI adjacencies inferred from pre-existing signaling made to the AMF.

In an example, a computer-implemented method comprises receiving an uplink non-access stratum (NAS) transport message. The uplink NAS transport message is received through a source base station. Further, the uplink NAS transport message is associated with a UE. The computer-implemented method further comprises determining a prior TAI associated with the UE. The prior TAI is determined based on the uplink NAS transport message. The computer-implemented method further comprises receiving a new message associated with the UE. The new message is received through a target base station. Further, the new message is received as the UE is transferred from the source base station to the target base station. The computer-implemented method further comprises determining a target TAI associated with the UE. The target TAI is determined based on the new message. The computer-implemented method further comprises automatically updating a TAI list associated with the UE. The TAI list is automatically updated to incorporate the prior TAI and the target TAI.

In an example, the new message is a path switch request message associated with an Xn handover process.

In an example, the new message is a handover acknowledgment associated with an N2 handover process.

In an example, the computer-implemented method further comprises determining a geographic adjacency between the source base station and the target base station. The geographic adjacency is determined based on the uplink NAS transport message and the new message. The computer-implemented method further comprises using the geographic adjacency to automatically update the TAI list.

In an example, the computer-implemented method further comprises generating a TAI adjacency graph. The TAI adjacency graph defines adjacencies amongst different TAIs within a 5G mobile network. Further, the TAI adjacency graph is generated based on the uplink NAS transport message, the new message, and previously identified TAI adjacencies.

In an example, the prior TAI and the target TAI are determined based on user location information included in the uplink NAS transport message and the new message.

In an example, the computer-implemented method further comprises identifying a TAI adjacency graph defining existing TAI adjacencies within a 5G mobile network. The computer-implemented method further comprises updating the TAI adjacency graph according to an adjacency between the prior TAI and the target TAI. Additionally, the computer-implemented method further comprises using the TAI adjacency graph to automatically update the TAI list.

In an example, a system comprises one or more processors and memory storing thereon instructions that, as a result of being executed by the one or more processors, cause the system to receive an uplink NAS transport message. The uplink NAS transport message is received through a source base station. Further, the uplink NAS transport message is associated with a UE. The instructions further cause the system to determine a prior TAI associated with the UE. The prior TAI is determined based on the uplink NAS transport message. The instructions further cause the system to receive a new message associated with the UE. The new message is received through a target base station. Further, the new message is received as the UE is transferred from the source base station to the target base station. The instructions further cause the system to determine a target TAI associated with the UE. The target TAI is determined based on the new message. The instructions further cause the system to automatically update a TAI list associated with the UE. The TAI list is automatically updated to incorporate the prior TAI and the target TAI.

In an example, a non-transitory computer-readable storage medium stores thereon executable instructions that, as a result of being executed by one or more processors of a computer system, cause the computer system to receive an uplink NAS transport message. The uplink NAS transport message is received through a source base station. Further, the uplink NAS transport message is associated with a UE. The executable instructions further cause the computer system to determine a prior TAI associated with the UE. The prior TAI is determined based on the uplink NAS transport message. The executable instructions further cause the computer system to receive a new message associated with the UE. The new message is received through a target base station. Further, the new message is received as the UE is transferred from the source base station to the target base station. The executable instructions further cause the computer system to determine a target TAI associated with the UE. The target TAI is determined based on the new message. The executable instructions further cause the computer system to automatically update a TAI list associated with the UE. The TAI list is automatically updated to incorporate the prior TAI and the target TAI.

DESCRIPTION OF EXAMPLE EMBODIMENTS

Figure 7:
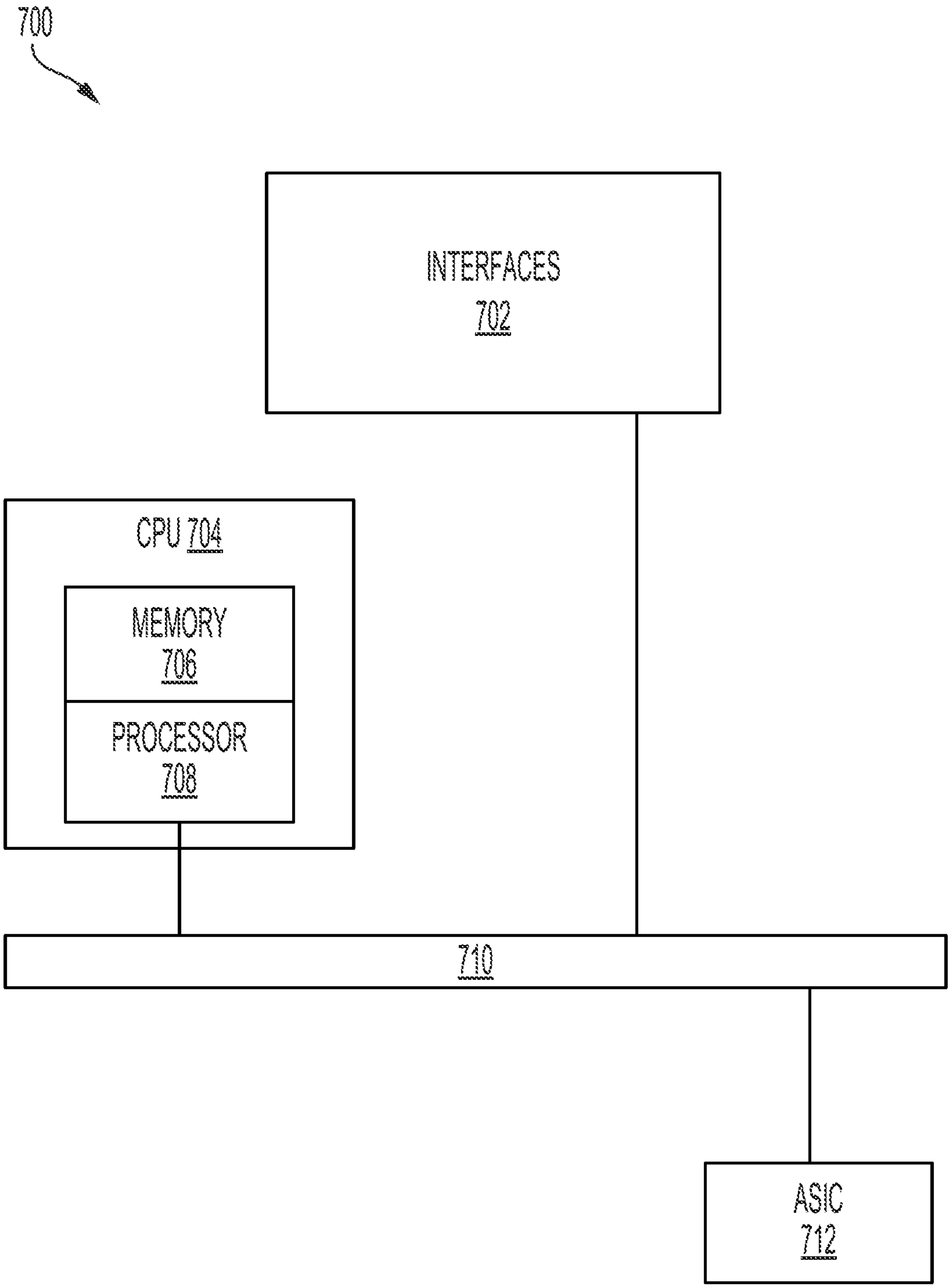
FIG. 7 illustrates an example network device suitable for performing switching, routing, and other networking operations in accordance with some embodiments.
Figure 8:
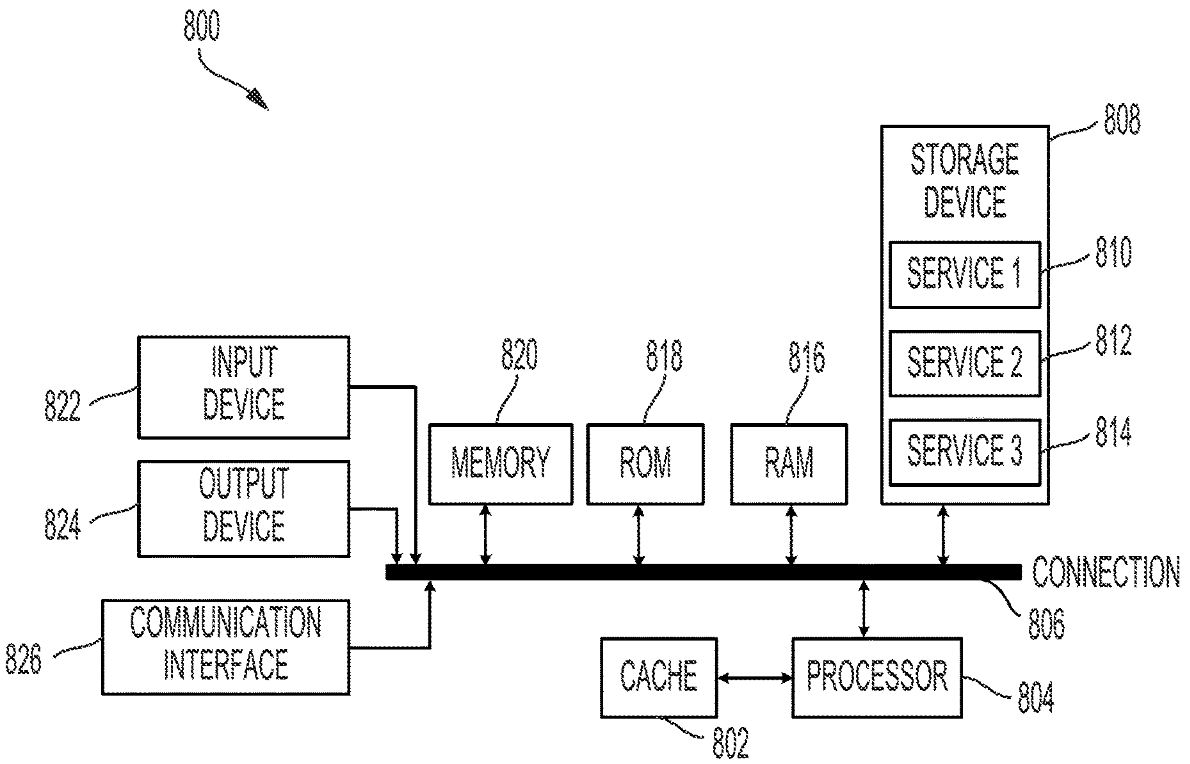
FIG. 8 illustrates a computing system architecture including various components in electrical communication with each other using a connection in accordance with some embodiments.

Disclosed herein are systems, methods and computer-readable storage media for automatically generating TAI lists for UEs within 5G mobile networks based TAI adjacencies inferred from pre-existing signaling made to the AMF. The present technologies will be described in more detail in the following disclosure as follows. The discussion begins with a detailed description of example systems, processes and environments for automatically generating TAI lists for UEs within 5G mobile networks, as illustrated in FIGS. 1 through 6. The discussion concludes with a description of an example network and computing devices, as illustrated in FIGS. 7 and 8.

FIG. 1 shows an illustrative example of an environment in which an AMF 102 associated with a 5G mobile network automatically determines TAI adjacencies based on handover signaling from source and target gNBs 104, 106 and uses the TAI adjacencies to automatically generate TAI lists 112 in accordance with at least one embodiment. In the environment 100, an AMF 102 is implemented in the control plane of a 5G mobile network that includes various base stations (e.g., gNBs) implemented to enable radio communications with different UEs within the geographic area serviced by the 5G mobile network. The AMF 102 is responsible for managing handovers between different gNBs within the 5G mobile network. For instance, the AMF 102 may support Xn handovers, whereby the source and target gNBs are interconnected within the 5G mobile network. For Xn handovers, the source and target gNBs may communicate with each other to complete one or more aspects of the UE handover. The AMF 102 may further support N2 handovers, whereby the UE may use the source gNB to trigger the handover of the UE to a target gNB within the 5G mobile network.

The AMF 102 further processes UE registration requests that are received when UEs initiate communication with a gNB within the 5G mobile network. In some instances, a UE registration request may indicate the TAI associated with the gNB that the UE submitting the request is initiating communication with. In response to the UE registration request, the AMF 102 may use the indicated TAI to generate a TAI list that may indicate any tracking area adjacencies to the present tracking area associated with the TAI. The TAI list may allow the UE to determine which tracking areas the UE may move to within the 5G mobile network without sending a mobility update registration request to the AMF 102.

In an embodiment, the AMF 102 automatically maintains and updates a TAI adjacency graph 110, which is automatically updated according to any detected TAI adjacencies within the 5G mobile network. For example, for a given tracking area, the TAI adjacency graph 110 may indicate the one or more tracking areas that are adjacent to the tracking area that the UE 108 is currently present in. As described in greater detail herein, the TAI adjacency graph 110 may be used by the AMF 102 to automatically generate TAI lists for different UEs according to the current tracking area of each UE within the 5G mobile network. In some instances, the automatic generation of TAI lists may be subject to one or more policies. These one or more policies may define any prioritization or adjacency length limitations for the TAI list that is to be generated and provided to a UE. For instance, if the one or more policies indicate that any TAI list that is to be assigned to a UE is required to have a maximum length of three TAIs (e.g., the TAI list may only list, at most, three TAIs corresponding to adjacent tracking areas in relation to the current tracking area), the AMF 102 may evaluate the TAI adjacency graph 110 to identify, at most, three tracking areas that are nearest to the current tracking area of the UE. Based on this identification, the AMF 102 may automatically generate a TAI list that includes the TAIs corresponding to these identified tracking areas.

In an embodiment, the AMF 102 can automatically update the TAI adjacency graph 110 based on signaling from the gNBs during handover processes performed amongst the gNBs when a UE 108 is handed over from one gNB to another within the 5G mobile network. For example, in an embodiment, the AMF 102 can process any signals received during an Xn handover process to identify any new tracking area adjacencies and, accordingly, update the TAI adjacency graph 110. As an illustrative example, if the UE 108 is being handed over from a source gNB 104 to a target gNB 106 through an Xn handover process, the source gNB 104 may transmit, to the AMF 102, an uplink NAS transport message. This uplink NAS transport message may indicate the current tracking area that the UE 108 is in within the 5G mobile network. As noted above, for Xn handovers, the source gNB 104 and the target gNB 106 may communicate with each other to complete one or more aspects of the UE handover. Accordingly, during the Xn handover, the target gNB 106 may transmit, to the AMF 102, a path switch request. The path switch request may indicate the destination tracking area for the UE 108 and associated with the target gNB 106. Since the AMF 102 has obtained Xn handover signals from the source gNB 104 and the target gNB 106 indicating the origin tracking area and destination tracking area for the UE 108, the AMF 102 may automatically determine that the origin tracking area and the destination tracking area are geographically adjacent.

As noted above, in an embodiment, the AMF 102 can further process any signals received during an N2 handover process to identify any new tracking area adjacencies and, accordingly, update the TAI adjacency graph 110. For instance, when the UE 108 is being handed over from the source gNB 104 to the target gNB 106 through an N2 handover process, the source gNB 104 may transmit, to the AMF 102, an uplink NAS transport message. Similar to the uplink NAS transport message described above in connection with the Xn handover process, this uplink NAS transport message may indicate the current tracking area that the UE 108 is in within the 5G mobile network. However, in the N2 handover process, the UE 108 may use the source gNB 104 to trigger the handover of the UE 108 to a target gNB 106 within the 5G mobile network. Thus, when the AMF 102 transmits a handover command to the source gNB 104 to cause the UE 108 to be handed over to the target gNB 106, the target gNB 106 may transmit a handover notify message to indicate that the UE 108 has been handed over to the target gNB 106. The handover notify message, in an embodiment, indicates the new tracking area that the UE 108 is in as a result of the N2 handover process. The AMF 102, using the uplink NAS transport message from the source gNB 104 and the handover notify message from the target gNB 106 received during the N2 handover process, may determine that the indicated tracking areas are geographically adjacent.

Once the AMF 102 has identified, either during an Xn or N2 handover process, an adjacency between an origin tracking area and a destination tracking area, the AMF 102 may evaluate the TAI adjacency graph 110 to determine whether the identified tracking area adjacency is illustrated within the TAI adjacency graph 110. If the TAI adjacency graph 110 already denotes the identified tracking area adjacency, the AMF 102 may continue to monitor new messages exchanged during Xn and N2 handover processes to identify tracking area adjacencies within the 5G mobile network. In an embodiment, if the AMF 102 determines that the identified tracking area adjacency is not indicated in the TAI adjacency graph 110, the AMF 102 can update the TAI adjacency graph 110 to denote this newly identified tracking area adjacency.

In some instances, using the updated TAI adjacency graph 110, the AMF 102 may generate a TAI list 112 that may be provided to the UE 108 according to any applicable policies. For example, based on the destination tracking area for the UE 108, the TAI adjacency graph 110, and the applicable policies, the AMF 102 may determine the relevant tracking area adjacencies for the destination tracking area associated with the UE 108 and generate a new TAI list 112 that may be provided to the UE 108. In some instances, if the AMF 102 determines that a previously provided TAI list is obsolete (e.g., the TAI list does not indicate the newly identified tracking area adjacency, etc.), the AMF 102 may transmit the new TAI list 112 including the newly identified tracking area adjacency to the UE 108. This may ensure that UEs within the 5G mobile network maintain updated TAI lists that represent the current tracking area topology within the 5G mobile network.

In an embodiment, the AMF 102 can detect when a tracking area is removed from the 5G mobile network. For instance, as the AMF 102 evaluates signals corresponding to Xn and N2 handover processes and identifies corresponding tracking area adjacencies, the AMF 102 may evaluate the TAI adjacency graph 110 to determine whether one or more denoted tracking area adjacencies have not been detected over a threshold period of time. For these tracking area adjacencies, the AMF 102 may determine whether a particular tracking area has not been identified over the threshold period of time as being adjacent to another tracking area that is known to be active within the 5G mobile network. Through this process, the AMF 102 may identify any inactive tracking areas denoted in the TAI adjacency graph 110 and, accordingly, update the TAI adjacency graph 110 to remove this tracking area and corresponding adjacencies from the TAI adjacency graph 110.

Figure 2:
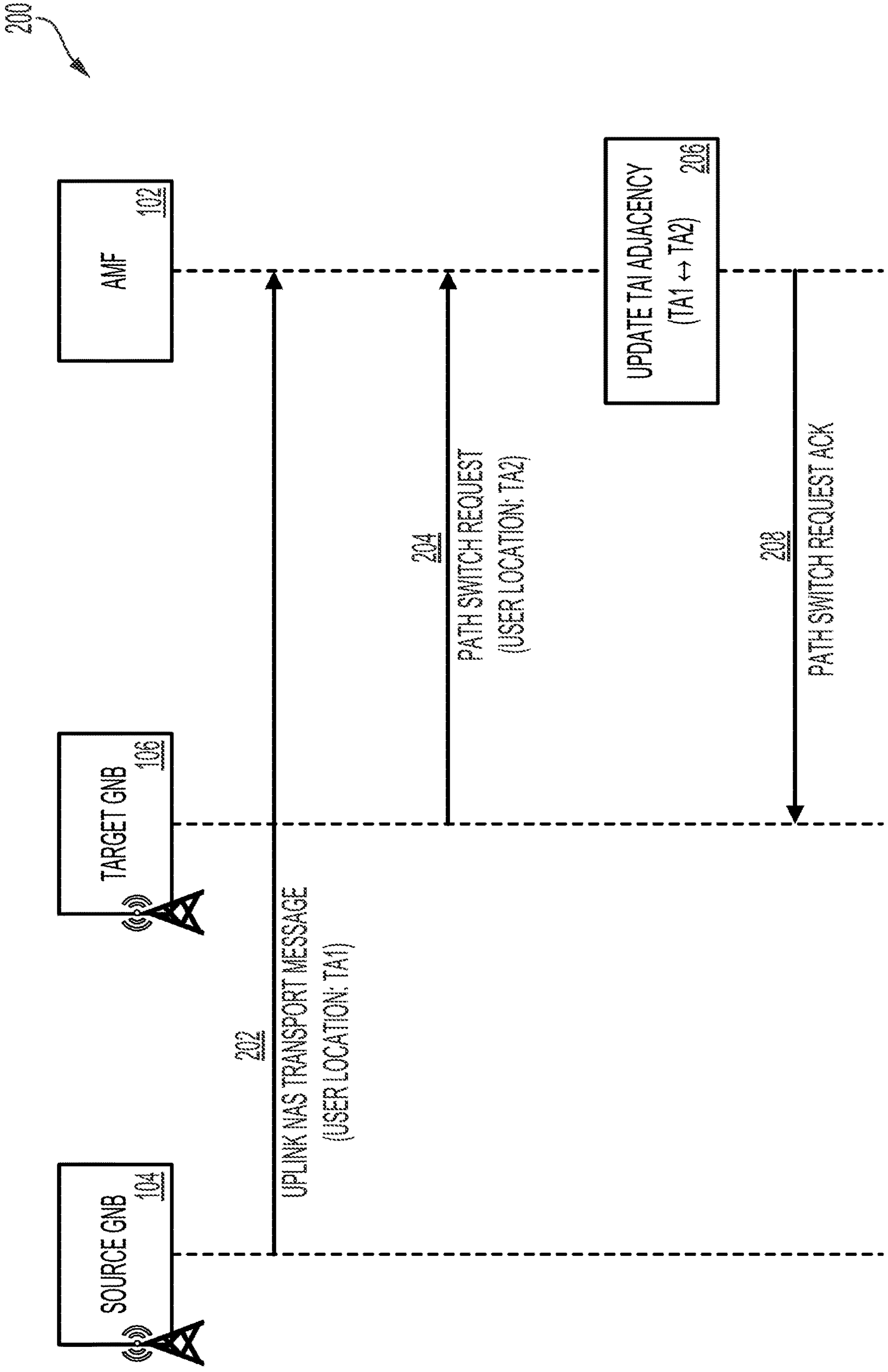
FIG. 2 shows an illustrative example of a process diagram for updating a TAI adjacency graph based on new TAI adjacencies identified during an Xn handover process in accordance with at least one embodiment.

FIG. 2 shows an illustrative example of a process diagram 200 for updating a TAI adjacency graph based on new TAI adjacencies identified during an Xn handover process in accordance with at least one embodiment. During an Xn handover process, whereby a UE is being handed over from a source gNB 104 to a target gNB 106 within the 5G mobile network, the source gNB 104 may transmit an uplink NAS transport message to the AMF 102 at step 202. The uplink NAS transport message may include user location information, which may denote the origin tracking area associated with the UE that is being handed over to the target gNB 106. The origin tracking area may be denoted through a TAI associated with the origin tracking area. The TAI may be constructed from a mobile country code (MCC) and a mobile network code (MNC) (collectively referred to as the Public Land Mobile Network (PLMN) identifier), as well as a tracking area code (TAC) corresponding to the tracking area. Through the received uplink NAS transport message, the AMF 102 may identify the origin tracking area that the UE is currently (e.g., TA1, as illustrated in FIG. 2).

During the Xn handover process, the AMF 102, at step 204, may receive a path switch request message from the target gNB 106. The path switch request message may include a list of packet data unit (PDU) sessions that have successfully switched and the list of PDU sessions that were not successful. In an embodiment, the path switch request message further includes user location information corresponding to the UE that is being handed over to the target gNB 106. Similar to the user location information provided by the source gNB 104 in the uplink NAS transport message, the path switch request message may denote the destination tracking area associated with the UE. The destination tracking area may be denoted through a TAI associated with the destination tracking area. This TAI may also be constructed from the PLMN identifier corresponding to the 5G mobile network and the TAC corresponding to the destination tracking area. Thus, from the path switch request message, the AMF 102 may identify the destination tracking area associated with the Xn handover process and the UE (e.g., TA2, as illustrated in FIG. 2).

At step 206, the AMF 102 may update the TAI adjacency graph according to the adjacency between the origin and destination tracking areas. For instance, based on the uplink NAS transport message and the path switch request message received by the AMF 102 during the Xn handover process, the AMF 102 may determine that the origin and destination tracking areas indicated are geographically adjacent to one another within the 5G mobile network. Accordingly, the AMF 102 may evaluate the TAI adjacency graph for the 5G mobile network to determine whether this adjacency between the origin and destination tracking areas (e.g., TAI and TA2, respectively) is denoted within the TAI adjacency graph. If the identified TAI adjacency is denoted within the TAI adjacency graph, the AMF 102 may denote that the TAI adjacency is still active and, thus, maintain the current state of the TAI adjacency graph. However, if the identified TAI adjacency is not denoted within the TAI adjacency graph, the AMF 102 may automatically update the TAI adjacency graph to denote the newly identified TAI adjacency. Thus, the TAI adjacency graph may denote a mapping of the tracking area topology within the 5G mobile network, through which the active adjacencies amongst different TAIs may be illustrated or otherwise indicated.

In an embodiment, if the AMF 102 updates the TAI adjacency graph to denote the newly identified TAI adjacency, the AMF 102 may generate a TAI list that may be provided to the UE according to any applicable policies. As noted above, based on the destination tracking area for the UE, the TAI adjacency graph, and the applicable policies, the AMF 102 may determine the relevant tracking area adjacencies for the destination tracking area associated with the UE and generate a new TAI list that may be provided to the UE. If the AMF 102 determines that a previously provided TAI list is obsolete, the AMF 102 may transmit the new TAI list including the newly identified tracking area adjacency to the UE.

At step 208, the AMF 102 creates a path switch request acknowledgment message that includes the PDU sessions that are successful in a success list and the PDU sessions that failed in a failure list. The AMF 102 may transmit this message to the target gNB 106. The AMF 102 may clear the source gNB 104 context and attaches the target gNB 106 context to the UE context to complete the Xn handover process. Thus, the AMF 102 may dynamically identify, during the execution of an Xn handover process, any new TAI adjacencies and update the TAI adjacency graph to indicate these new TAI adjacencies. Further, during the Xn handover process, the AMF 102 may update or generate new TAI lists that may be provided to UEs so that these UEs may have a current representation of the tracking area topology of the 5G mobile network.

Figure 3:
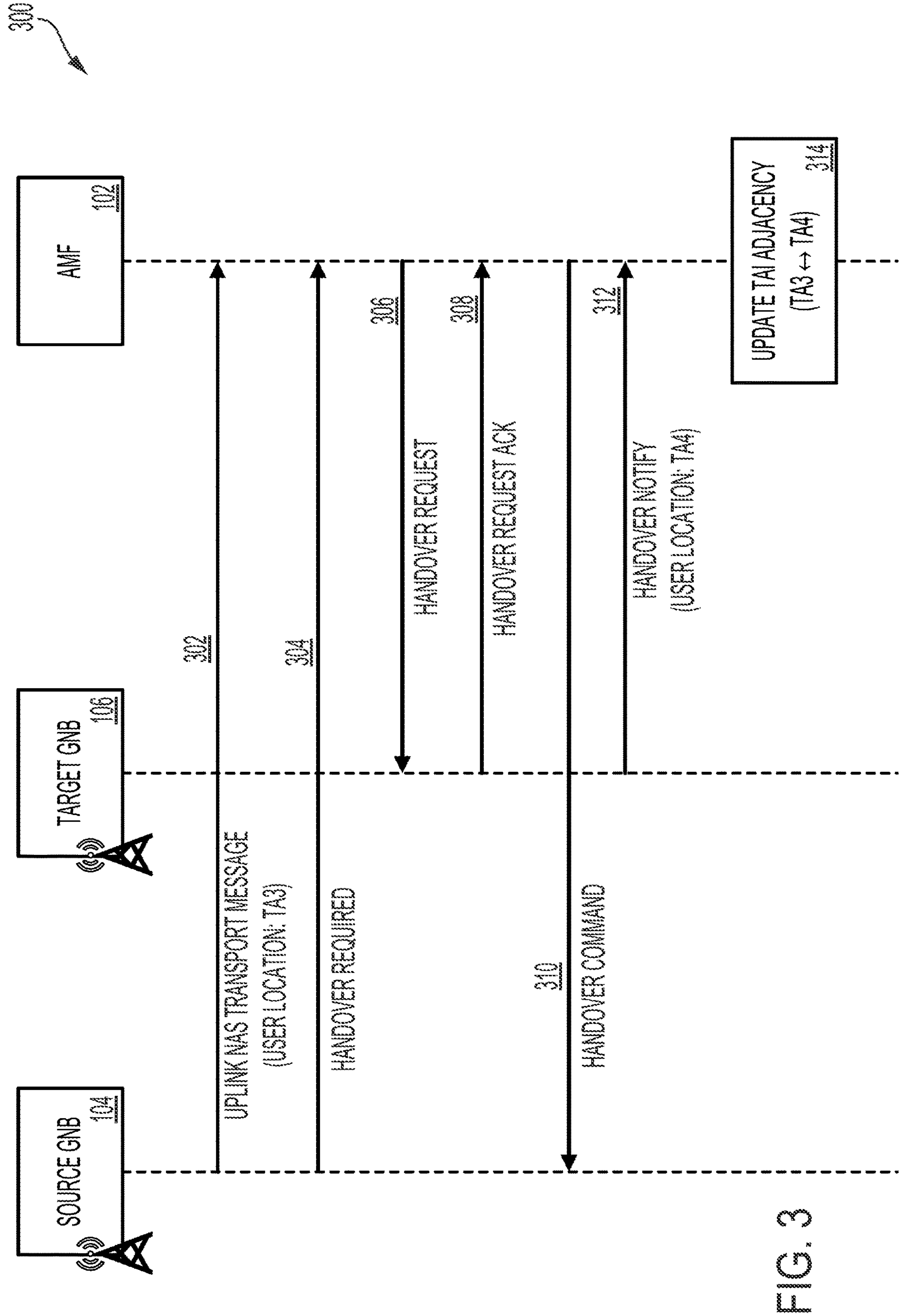
FIG. 3 shows an illustrative example of a process diagram for updating a TAI adjacency graph based on new TAI adjacencies identified during an N2 handover process in accordance with at least one embodiment.

FIG. 3 shows an illustrative example of a process diagram 300 for updating a TAI adjacency graph based on new TAI adjacencies identified during an N2 handover process in accordance with at least one embodiment. During an N2 handover process, whereby a UE is being handed over from a source gNB 104 to a target gNB 106 within the 5G mobile network, the source gNB 104 may transmit an uplink NAS transport message to the AMF 102 at step 302. The uplink NAS transport message transmitted by the source gNB 104 to the AMF 102 may similar to the uplink NAS transport message described above in connection with the Xn handover process illustrated in FIG. 2. For instance, the uplink NAS transport message may include user location information, which may denote the TAI of the origin tracking area associated with the UE that is being handed over to the target gNB 106. Through the received uplink NAS transport message, the AMF 102 may identify the origin tracking area that the UE is currently (e.g., TA3, as illustrated in FIG. 3).

At step 304, in response to signaling from the UE indicating a need to transition to a new gNB (such as target gNB 106), the source gNB 104 may transmit a handover required message to the AMF 102. In response to the handover required message, the AMF 102 may identify a gNB that can support the signaled TargetID from the source gNB 104. For instance, the AMF 102 may find the gNB corresponding to the TargetID specified in the handover required message (e.g., target gNB 106) and the NG Application Protocol (NGAP) Elementary Procedure (EP) that serves the target gNB 106. Once this is completed, the AMF 102 transmits, at step 306, a handover request message to the target gNB 106.

In response to the handover request message from the AMF 102, the target gNB 106 may configure the resources required for the UE handover and, at step 308, responds to the handover request message by transmitting, to the AMF 102, a handover request acknowledgement message. The AMF 102, in response to the handover request acknowledgement message, may construct a Session Management (SM) Context Modify message to update the target gNB 106 tunnel endpoint identifiers to the SM function (SMF) in the control plane. The AMF 102 may initiate a guard timer and forward the SM Context Modify message to the SMF.

At step 310, the AMF 102 may generate a handover command message and transmits this message to the source gNB 104, which may allow the UE to complete the handover process at the target gNB 106. Accordingly, the target gNB 106, at step 312, may transmit a handover notify message to the AMF 102 to indicate the completion of the handover process. In an embodiment, the handover notify message denotes the destination tracking area associated with the UE. The destination tracking area may be denoted through a TAI associated with the destination tracking area. This TAI may be constructed from the PLMN identifier corresponding to the 5G mobile network and the TAC corresponding to the destination tracking area. Thus, from the handover notify message, the AMF 102 may identify the destination tracking area associated with the N2 handover process and the UE (e.g., TA4, as illustrated in FIG. 3).

At step 314, the AMF 102 may update the TAI adjacency graph according to the adjacency between the origin and destination tracking areas. For instance, based on the uplink NAS transport message and the handover notify message received by the AMF 102 during the N2 handover process, the AMF 102 may determine that the origin and destination tracking areas indicated are geographically adjacent to one another within the 5G mobile network. Accordingly, the AMF 102 may evaluate the TAI adjacency graph for the 5G mobile network to determine whether this adjacency between the origin and destination tracking areas (e.g., TA3 and TA4, respectively) is denoted within the TAI adjacency graph. If the identified TAI adjacency is denoted within the TAI adjacency graph, the AMF 102 may denote that the TAI adjacency is still active and, thus, maintain the current state of the TAI adjacency graph. However, if the identified TAI adjacency is not denoted within the TAI adjacency graph, the AMF 102 may automatically update the TAI adjacency graph to denote the newly identified TAI adjacency. Thus, the TAI adjacency graph may denote a mapping of the tracking area topology within the 5G mobile network, through which the active adjacencies amongst different TAIs may be illustrated or otherwise indicated.

Similar to the process described above in connection with FIG. 2, if the AMF 102 updates the TAI adjacency graph during the N2 handover process to denote the newly identified TAI adjacency, the AMF 102 may generate a TAI list that may be provided to the UE according to any applicable policies. As noted above, based on the destination tracking area for the UE, the TAI adjacency graph, and the applicable policies, the AMF 102 may determine the relevant tracking area adjacencies for the destination tracking area associated with the UE and generate a new TAI list that may be provided to the UE. If the AMF 102 determines that a previously provided TAI list is obsolete, the AMF 102 may transmit the new TAI list including the newly identified tracking area adjacency to the UE. Once the AMF 102 has received the handover notify message from the target gNB 106, the AMF 102 may construct a new SM Context Modify message to inform the SMF that the handover of the UE to the target gNB 106 is complete.

Figure 4A:
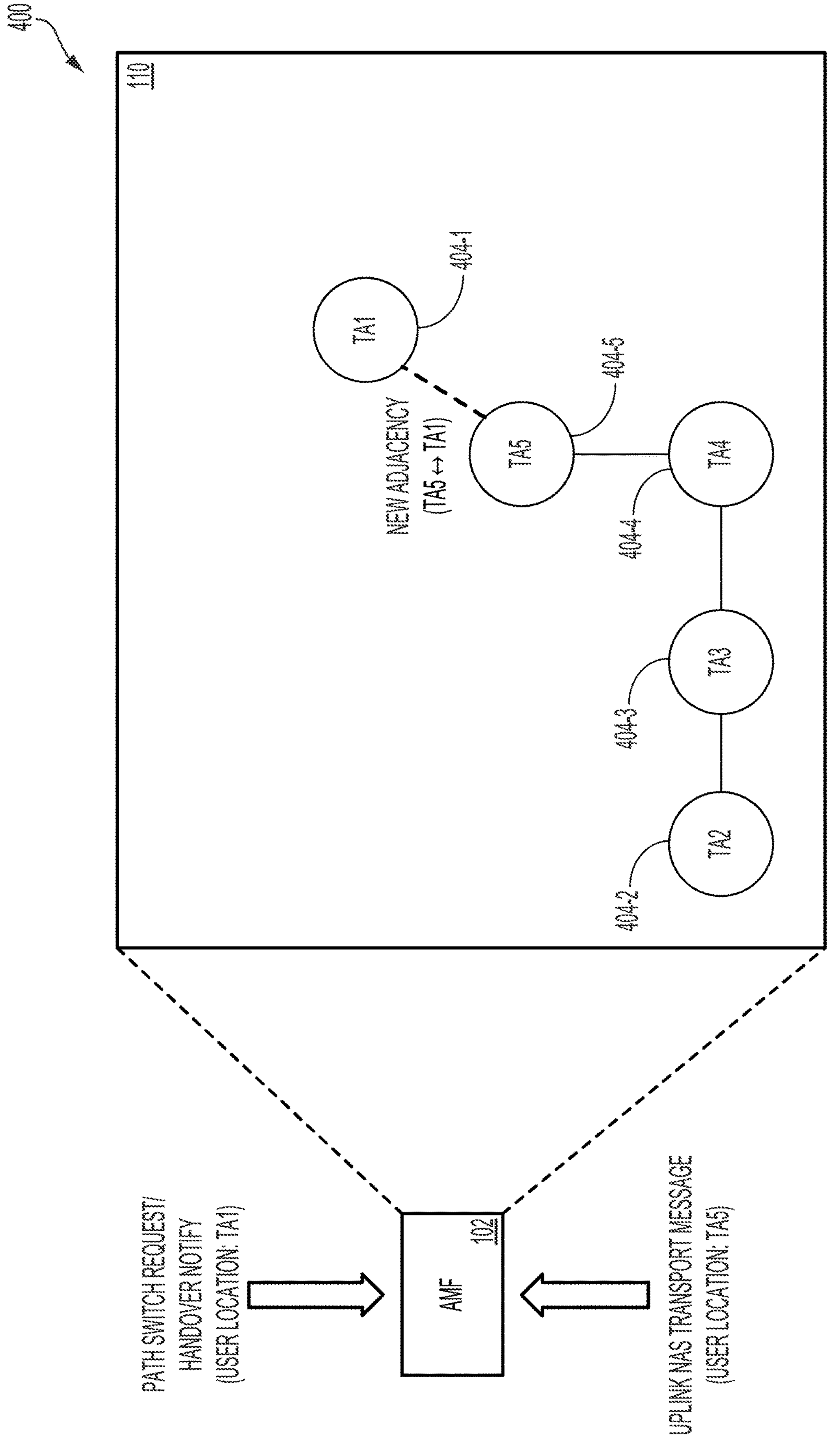
FIGS. 4A-4C show an illustrative example of an environment in which an AMF automatically updates a TAI adjacency graph in real-time as handover signals are received from different gNBs within the 5G mobile network in accordance with at least one embodiment.
Figure 4B:
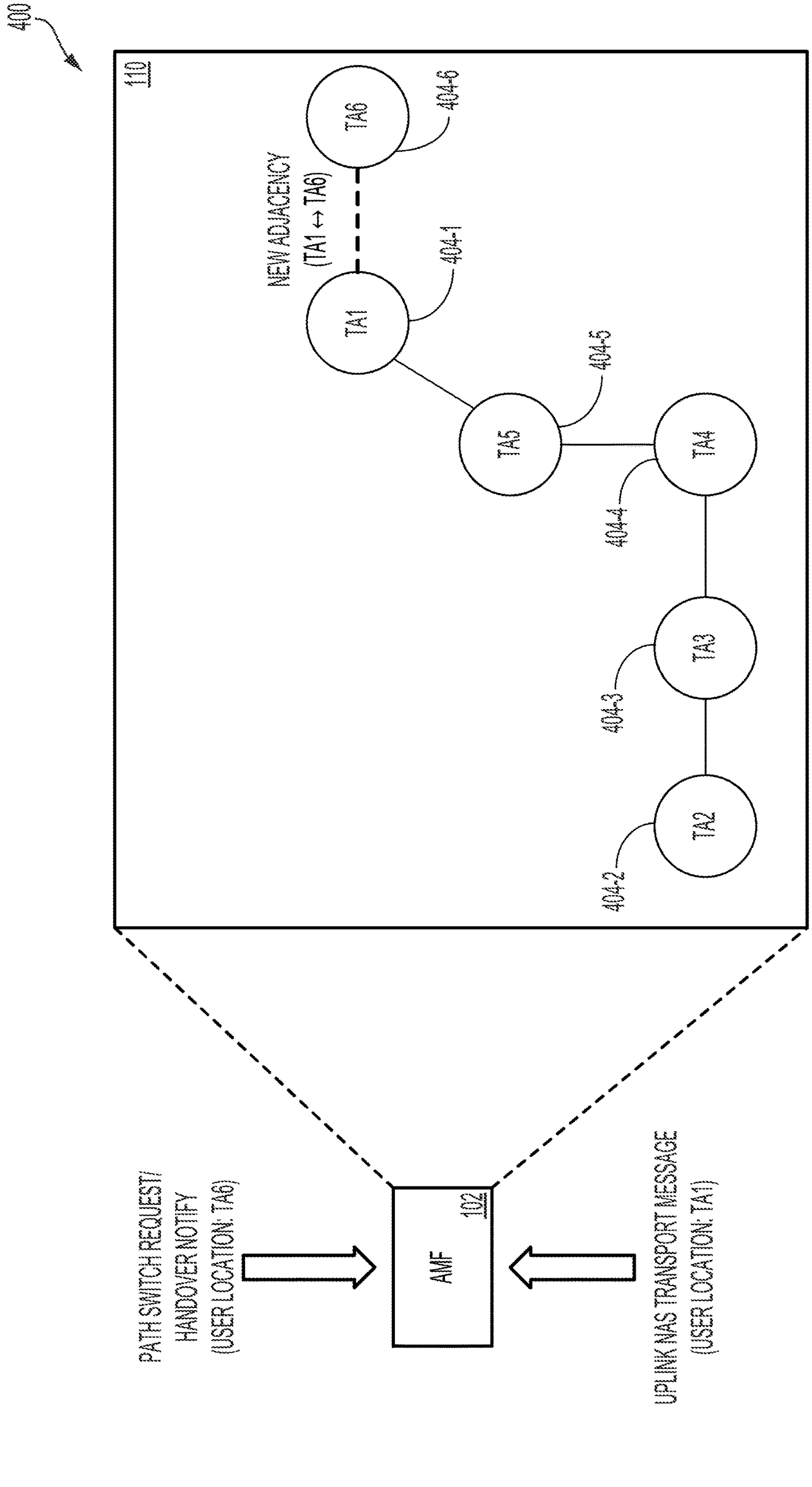
Figure 4C:
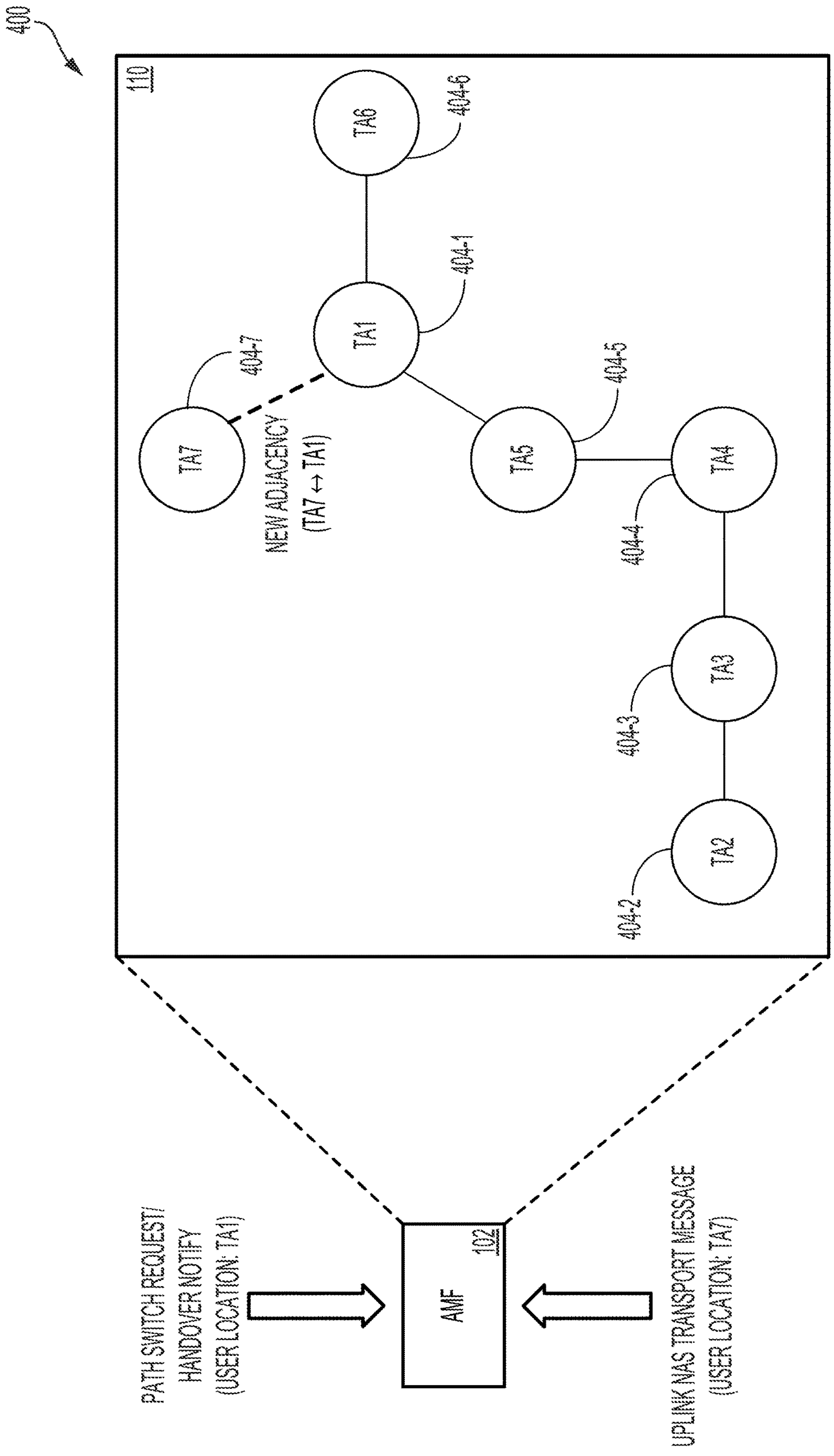

FIGS. 4A-4C show an illustrative example of an environment 400 in which an AMF 102 automatically updates a TAI adjacency graph 110 in real-time as handover signals are received from different gNBs within the 5G mobile network in accordance with at least one embodiment. In the environment 400, and as illustrated in FIG. 4A, the AMF 102 may maintain a TAI adjacency graph 110, which may provide an indication of the tracking area topology within the 5G mobile network. For example, the TAI adjacency graph 110 may provide an indication of any previously detected tracking area adjacencies within the 5G mobile network, as determined through handover signaling from source and target gNBs within the 5G mobile network during execution of different UE handover processes (e.g., Xn handover processes, N2 handover processes, etc.). As illustrated in FIG. 4A, the TAI adjacency graph 110 may initially indicate existing tracking area adjacencies for tracking areas TA2 404-2, TA3 404-3, TA4 404-4, and TA5 404-5. The tracking area adjacencies amongst these tracking areas 404-2-404-5 may have been previously determined based on UE handover processes performed amongst gNBs corresponding to these tracking areas 404-2-404-5.

As illustrated in FIG. 4A, the AMF 102 may receive, from a source gNB, an uplink NAS transport message that includes user location information corresponding to the current tracking area of a UE. As noted above, the current tracking area may be denoted through a TAI associated with the current tracking area. This TAI may be constructed from a PLMN identifier corresponding to the 5G mobile network and a TAC corresponding to the current tracking area. Through the received uplink NAS transport message, the AMF 102 may identify the current tracking area that the UE is currently in (e.g., TA5, as illustrated in FIG. 4A).

During a handover process associated with the UE and the source gNB that submitted the uplink NAS transport message, the AMF 102 may receive a message that indicates new user location information corresponding to the new tracking area that the UE is in as a result of the handover process. For example, during an Xn handover process, the AMF 102 may receive a path switch request message from the target gNB and that includes the new user location information corresponding to the new tracking area that the corresponding UE is in. As another illustrative example, during an N2 handover process, the AMF 102 may receive a handover notify message from the target gNB that includes the aforementioned new user location information. Thus, during any UE handover process, the AMF 102 may determine the TAI corresponding to the new tracking area that the UE is in as a result of the UE handover process.

As illustrated in FIG. 4A, a UE handover process message from the target gNB may indicate that the UE is now within tracking area TA1 404-1 within the 5G mobile network. The AMF 102, using the uplink NAS transport message from the source gNB and the UE handover message from the target gNB (e.g., the path switch request message or the handover notify message) received during the UE handover process, may determine that the indicated tracking areas (e.g., tracking area TA1 404-1 and tracking area TA5 404-5) are geographically adjacent.

In an embodiment, the AMF 102 evaluates the TAI adjacency graph 110 to determine whether the newly identified tracking area adjacency (e.g., TA1 404-1 to TA5 404-5) is indicated within the TAI adjacency graph 110. For instance, as illustrated in FIG. 4A, the TAI adjacency graph 110 may originally not denote the tracking area adjacency between tracking area TA1 404-1 and tracking area TA5 404-5. Accordingly, the AMF 102 may automatically update the TAI adjacency graph 110 to indicate the newly identified adjacency between tracking area TA1 404-1 and tracking area TA5 404-5. As illustrated in FIG. 4A, the resulting TAI adjacency graph 110, for tracking area TA5 404-5, may now denote proximate adjacencies between tracking area TA5 404-5 and tracking areas TA1 404-1 and TA4 404-4. Further, because tracking area TA1 404-1 was not previously known as being part of the 5G mobile network TAI adjacency topology, the updated TAI adjacency graph 110 may now denote the relative location of tracking area TA1 404-1 within the complete TAI adjacency topology.

At a later time, as illustrated in FIG. 4B, the AMF 102 may receive a new uplink NAS transport message from a source gNB. The new uplink NAS transport message includes user location information corresponding to the current tracking area of a UE, namely tracking area TA1 404-1. As noted above, the AMF 102 previously updated the TAI adjacency graph 110 to denote the tracking adjacency between tracking area TA1 404-1 and tracking area TA5 404-5. Thus, the AMF 102, through an evaluation of the TAI adjacency graph 110, may determine that a known adjacency exists between tracking area TA1 404-1 and tracking area TA5 404-5.

During a handover process associated with a UE and the source gNB that submitted the new uplink NAS transport message, the AMF 102 may receive a message that indicates new user location information corresponding to the new tracking area that the UE is in as a result of the handover process. As illustrated in FIG. 4B, the UE handover process message from the target gNB may indicate that the UE is now within tracking area TA6 404-6 within the 5G mobile network. The AMF 102, using the new uplink NAS transport message from the source gNB and the new UE handover message from the target gNB (e.g., the path switch request message or the handover notify message) received during the UE handover process, may determine that the indicated tracking areas (e.g., tracking area TA1 404-1 and tracking area TA6 404-6) are geographically adjacent.

The AMF 102 may again evaluate the TAI adjacency graph 110 to determine whether the newly identified tracking area adjacency (e.g., TA1 404-1 to TA6 404-6) is indicated within the TAI adjacency graph 110. For instance, as illustrated in FIG. 4B, the TAI adjacency graph 110 may originally not denote the tracking area adjacency between tracking area TA1 404-1 and tracking area TA6 404-6. Accordingly, the AMF 102 may automatically update the TAI adjacency graph 110 to indicate the newly identified adjacency between tracking area TA1 404-1 and tracking area TA6 404-6. As illustrated in FIG. 4B, the resulting TAI adjacency graph 110, for tracking area TA6 404-6, may now denote proximate adjacency between tracking area TA6 404-6 and tracking area TA1 404-1. Further, because tracking area TA1 404-6 was not previously known as being part of the 5G mobile network TAI adjacency topology, the updated TAI adjacency graph 110 may now denote the relative location of tracking area TA6 404-6 within the complete TAI adjacency topology.

As illustrated in FIG. 4C, the AMF 102 may receive, at a later time after the handover processes described above, a new uplink NAS transport message that includes user location information corresponding to a new tracking area TA7 404-7. This new tracking area TA7 404-7 may not have been previously encountered by the AMF 102 through signaling provided by source and target gNBs within the 5G mobile network. Thus, the TAI adjacency graph 110 may not initially include any known tracking adjacencies that include the new tracking area TA7 404-7.

During a handover process associated with a UE and the source gNB that submitted this new uplink NAS transport message corresponding to the new tracking area TA7 404-7, the AMF 102 may receive a message that indicates new user location information corresponding to the tracking area that the UE is in as a result of the handover process. As illustrated in FIG. 4C, the UE handover process message from the target gNB may indicate that the UE is now within tracking area TA1 404-1 within the 5G mobile network. The AMF 102, using the new uplink NAS transport message from the source gNB and the new UE handover message from the target gNB (e.g., the path switch request message or the handover notify message) received during the UE handover process, may determine that the indicated tracking areas (e.g., tracking area TA1 404-1 and tracking area TA7 404-7) are geographically adjacent.

In response to detecting the tracking adjacency between tracking area TA1 404-1 and tracking area TA7 404-7, the AMF 102 may again evaluate the TAI adjacency graph 110 to determine that the newly identified tracking area adjacency (e.g., TA1 404-1 to TA7 404-7) is not indicated within the TAI adjacency graph 110. As noted above, the AMF 102 may automatically determine that this tracking area adjacency is not present in the TAI adjacency graph 110 as a result of tracking area TA7 404-7 (as indicated in the new uplink NAS transport message) not being referenced in the TAI adjacency graph 110. Thus, as illustrated in FIG. 4C, the TAI adjacency graph 110 may originally not denote the tracking area adjacency between tracking area TA1 404-1 and tracking area TA7 404-7. Accordingly, the AMF 102 may automatically update the TAI adjacency graph 110 to indicate the newly identified adjacency between tracking area TA1 404-1 and tracking area TA7 404-7. As illustrated in FIG. 4C, the resulting TAI adjacency graph 110, for tracking area TA7 404-7, may now denote proximate adjacency between tracking area TA7 404-7 and tracking area TA1 404-1. Further, because tracking area TA1 404-7 was not previously known as being part of the 5G mobile network TAI adjacency topology, the updated TAI adjacency graph 110 may now denote the relative location of tracking area TA7 404-7 within the complete TAI adjacency topology. Further, because tracking area TA7 404-7 was not previously known to be adjacent to any other tracking areas in the 5G mobile network, the TAI adjacency graph 110 may only denote the detected tracking adjacency between tracking area TA7 404-7 and tracking area TA1 404-1.

Thus, as new tracking area adjacencies are detected by the AMF 102, the AMF 102 may continuously and in real-time update the TAI adjacency graph 110 to indicate these new tracking area adjacencies. Further, as these new tracking area adjacencies are recorded in the TAI adjacency graph 110, the AMF 102 may further generate new TAI lists for different UEs within the 5G mobile network as these UEs navigate through different tracking areas. As noted above, in addition to adding newly detected tracking area adjacencies, the AMF 102 may further detect when a tracking area is removed from the 5G mobile network or is otherwise no longer adjacent to one or more other tracking areas. For instance, as the AMF 102 evaluates signals corresponding to Xn and N2 handover processes and identifies corresponding tracking area adjacencies, the AMF 102 may evaluate the TAI adjacency graph 110 to determine whether one or more denoted tracking area adjacencies have not been detected over a threshold period of time. For these tracking area adjacencies, the AMF 102 may determine whether a particular tracking area has not been identified over the threshold period of time as being adjacent to another tracking area that is known to be active within the 5G mobile network. Through this process, the AMF 102 may identify any inactive tracking areas denoted in the TAI adjacency graph 110 and, accordingly, update the TAI adjacency graph 110 to remove this tracking area and any corresponding adjacencies from the TAI adjacency graph 110.

Figure 5:
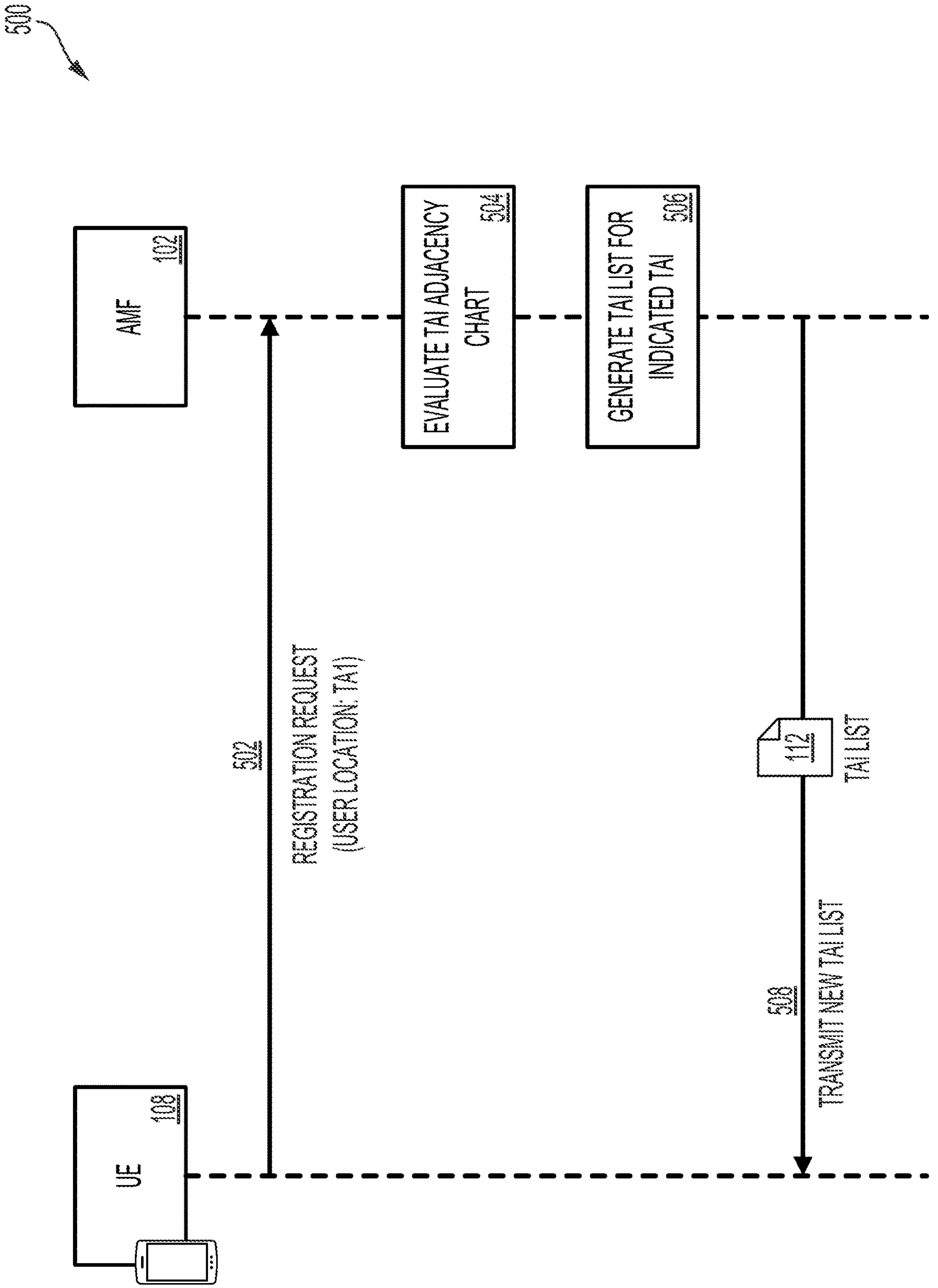
FIG. 5 shows an illustrative example of a process diagram for automatically generating a TAI list for a UE in response to a registration request in accordance with at least one embodiment.

FIG. 5 shows an illustrative example of a process diagram 500 for automatically generating a TAI list 112 for a UE 108 in response to a registration request in accordance with at least one embodiment. When a UE 108 wants to register itself with the 5G mobile network, the UE 108, at step 502, may send a registration request message towards the AMF 102. The registration request message may indicate a registration type, a Subscriber Concealed Identifier (SUCI) or 5G Globally Unique Temporary Identity (5G-GUTI), the last visited tracking area (e.g., tracking area TA1, as illustrated in FIG. 5), any security parameters, the requested network slice selection assistance information (NSSAI), UE radio and MM core network capabilities, PDU session status, a list of PDU sessions that are to be activated, and the like.

During this UE registration process, the AMF 102, amongst other operations required for registration of the UE 108 with the 5G mobile network, may evaluate the TAI adjacency chart at step 504. As noted above, the TAI adjacency chart may indicate any known tracking area adjacencies amongst different tracking areas within the 5G mobile network. In an embodiment, the AMF 102 can process the registration request to identify the last visited tracking area for the UE 108. For example, as illustrated in FIG. 5, the AMF 102 may determine, from the registration request, that the UE 108 last visited tracking area TA1 within the 5G mobile network. Accordingly, the AMF 102 may evaluate the TAI adjacency chart to identify the location of tracking area TA1 within the tracking area topology and, based on this tracking area topology, identify any tracking area adjacencies associated with tracking area TA1.

At step 506, the AMF 102 may generate a TAI list corresponding to the identified tracking area from the UE registration request. For instance, through the evaluation of the TAI adjacency graph according to the specified tracking area (e.g., tracking area TA1), the AMF 102 may generate a prioritized list of other tracking areas within the 5G mobile network according to the graph breadth search of the TAI adjacency graph. For example, any tracking areas that are directly adjacent to tracking area TA1 may be given higher priority compared to other tracking areas that may not be directly adjacent to tracking area TA1. The prioritization of other tracking areas for the TAI list may, thus, be performed according to the degrees of separation between the tracking area indicated in the UE registration request and the other tracking areas indicated in the TAI adjacency graph.

As noted above, the automatic generation of TAI lists may be subject to one or more policies. These one or more policies may define any prioritization or adjacency length limitations for the TAI list that is to be generated and provided to a UE 108. For instance, if the one or more policies indicate that any TAI list that is to be assigned to a UE 108 can have a maximum length of three TAIs (e.g., the TAI list may only list, at most, three TAIs corresponding to adjacent tracking areas in relation to the current tracking area), the AMF 102 may evaluate the TAI adjacency graph to identify, at most, three tracking areas that are nearest to the current tracking area of the UE 108. Based on this identification, the AMF 102 may automatically generate a TAI list that includes the TAIs corresponding to these identified tracking areas according to the applicable policies.

At step 508, the AMF 102 may transmit the newly generated TAI list 112 to the UE 108 as part of the UE registration process. As the UE 108 navigates through the 5G mobile network, the AMF 102 may continuously generate updated TAI lists that may be provided to the UE 108 according to any applicable policies. For example, based on the destination tracking area for the UE 108, the TAI adjacency graph, and the applicable policies, the AMF 102 may determine the relevant tracking area adjacencies for the destination tracking area associated with the UE 108 and generate a new TAI list that may be provided to the UE 108. In some instances, if the AMF 102 determines that a previously provided TAI list is obsolete (e.g., the TAI list does not indicate any newly identified tracking area adjacencies as detected by the AMF 102, etc.), the AMF 102 may transmit the new TAI list including the newly identified tracking area adjacency to the UE 108. This may ensure that UEs within the 5G mobile network maintain updated TAI lists that represent the current tracking area topology within the 5G mobile network.

Figure 6:
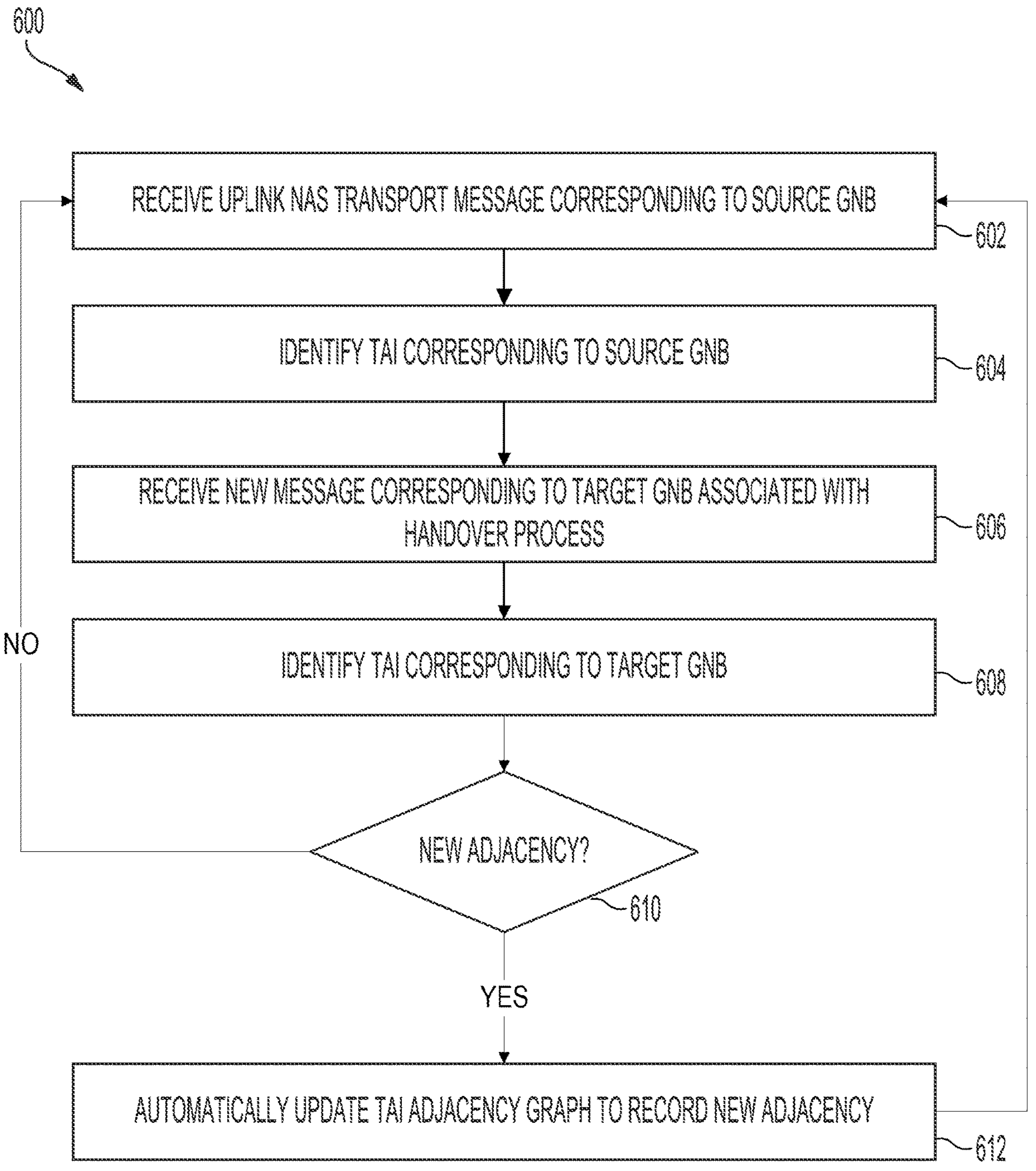
FIG. 6 shows an illustrative example of a process for automatically updating a TAI adjacency graph according to newly detected TAI adjacencies in accordance with at least one embodiment.

FIG. 6 shows an illustrative example of a process 600 for automatically updating a TAI adjacency graph according to newly detected TAI adjacencies in accordance with at least one embodiment. The process 600 may be performed by an AMF operating within the control plane of a 5G mobile network. At step 602, the AMF may receive an uplink NAS transport message corresponding to a source gNB within the 5G mobile network. As noted above, the uplink NAS transport message may include user location information corresponding to the current tracking area of a UE. In some instances, the current tracking area of the UE, within the uplink NAS transport message, may be denoted through a TAI that is associated with this current tracking area. Thus, at step 604, the AMF may evaluate the received uplink NAS transport message to identify the tracking area and corresponding TAI associated with the source gNB.

At step 606, the AMF may receive a new message corresponding to a target gNB that is associated with an active handover process. For instance, during a handover process associated with the UE and the source gNB that submitted the uplink NAS transport message, the AMF 102 may receive a message that indicates new user location information corresponding to the new tracking area that the UE is in as a result of the handover process. For example, during an Xn handover process, the AMF may receive a path switch request message from the target gNB that includes the new user location information corresponding to the new tracking area that the corresponding UE is in. As another illustrative example, during an N2 handover process, the AMF may receive a handover notify message from the target gNB that includes the aforementioned new user location information. Thus, during any UE handover process, the AMF, at step 608, may evaluate the new message corresponding to the target gNB to identify the TAI corresponding to the new tracking area that the UE is in as a result of the UE handover process.

At step 610, the AMF may determine whether the tracking areas indicated within the uplink NAS transport message and the new handover process message correspond to a new tracking area adjacency that is to be added to the TAI adjacency graph. As noted above, based on the TAI indicated in the uplink NAS transport message and the TAI indicated in the new handover process message, the AMF may determine that the tracking areas corresponding to these two different TAIs are geographically adjacent. Accordingly, the AMF may evaluate the existing TAI adjacency graph for the 5G mobile network to determine whether this tracking area adjacency is specified in the TAI adjacency graph.

If the TAI adjacency graph already denotes the identified tracking area adjacency, the AMF may continue to monitor new uplink NAS transport messages and handover messages exchanged during Xn and N2 handover processes to identify tracking area adjacencies within the 5G mobile network, thereby restarting the process 600. However, if the AMF determines that the identified tracking area adjacency is not indicated in the TAI adjacency graph (e.g., the identified tracking area adjacency is new), the AMF, at step 612, may automatically update the TAI adjacency graph to record this newly identified tracking area adjacency. The AMF may subsequently continue to monitor new uplink NAS transport messages and handover messages exchanged during Xn and N2 handover processes to identify tracking area adjacencies within the 5G mobile network, thereby restarting the process 600.

FIG. 7 illustrates an example network device 700 suitable for performing switching, routing, and other networking operations in accordance with some implementations. Network device 700 includes a CPU 704, interfaces 702, and a connection 710 (e.g., a Peripheral Component Interconnect (PCI) bus). When acting under the control of appropriate software or firmware, the CPU 704 is responsible for executing packet management, error detection, and/or routing functions. The CPU 704 can accomplish these functions under the control of software including an operating system and any appropriate applications software. The CPU 704 may include one or more processors 708, such as a processor from the Intel® X98 family of microprocessors. In some cases, the processor 708 can be specially designed hardware for controlling the operations of network device 700. In some cases, a memory 706 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:

receiving an uplink non-access stratum (NAS) transport message, wherein the uplink NAS transport message is received through a source base station, and wherein the uplink NAS transport message is associated with a user equipment (UE);

determining a prior Tracking Area Identity (TAI) associated with the UE, wherein the prior TAI is determined based on the uplink NAS transport message;

receiving a new message associated with the UE, wherein the new message is received through a target base station, and wherein the new message is received as the UE is transferred from the source base station to the target base station;

determining a target TAI associated with the UE, wherein the target TAI is determined based on the new message;

identifying a TAI adjacency graph defining existing TAI adjacencies within a 5G mobile network;

determining an adjacency between the prior TAI and the target TAI based on the uplink NAS transport message and the new message;

determining that the adjacency is absent from, or newly learned with respect to, the TAI adjacency graph to yield a determination;

updating the TAI adjacency graph based on the determination; and automatically updating a TAI list associated with the UE using updated TAI adjacency graph, wherein the TAI list is automatically updated to incorporate the prior TAI and the target TAI.

2. The computer-implemented method of claim 1, wherein the new message is a path switch request message associated with an Xn handover process.

3. The computer-implemented method of claim 1, wherein the new message is a handover acknowledgment associated with an N2 handover process.

4. The computer-implemented method of claim 1, further comprising:

determining a geographic adjacency between the source base station and the target base station, wherein the geographic adjacency is determined based on the uplink NAS transport message and the new message; and using the geographic adjacency to automatically update the TAI list.

5. The computer-implemented method of claim 1, further comprising:

generating a TAI adjacency graph, wherein the TAI adjacency graph defines adjacencies amongst different TAIs within a 5G mobile network, and wherein the TAI adjacency graph is generated based on the uplink NAS transport message, the new message, and previously identified TAI adjacencies.

6. The computer-implemented method of claim 1, wherein the prior TAI and the target TAI are determined based on user location information included in the uplink NAS transport message and the new message.

7. A system, comprising:

one or more processors; and memory storing thereon instructions that, as a result of being executed by the one or more processors, cause the system to:

receive an uplink non-access stratum (NAS) transport message, wherein the uplink NAS transport message is received through a source base station, and wherein the uplink NAS transport message is associated with a user equipment (UE);

determine a prior Tracking Area Identity (TAI) associated with the UE, wherein the prior TAI is determined based on the uplink NAS transport message;

receive a new message associated with the UE, wherein the new message is received through a target base station, and wherein the new message is received as the UE is transferred from the source base station to the target base station;

determine a target TAI associated with the UE, wherein the target TAI is determined based on the new message;

identify a TAI adjacency graph defining existing TAI adjacencies within a 5G mobile network;

determine an adjacency between the prior TAI and the target TAI based on the uplink NAS transport message and the new message;

determine that the adjacency is absent from, or newly learned with respect to, the TAI adjacency graph to yield a determination;

update the TAI adjacency graph based on the determination; and automatically update a TAI list associated with the UE using updated TAI adjacency, wherein the TAI list is automatically updated to incorporate the prior TAI and the target TAI.

8. The system of claim 7, wherein the new message is a path switch request message associated with an Xn handover process.

9. The system of claim 7, wherein the new message is a handover acknowledgment associated with an N2 handover process.

10. The system of claim 7, wherein the instructions further cause the system to:

determine a geographic adjacency between the source base station and the target base station, wherein the geographic adjacency is determined based on the uplink NAS transport message and the new message; and use the geographic adjacency to automatically update the TAI list.

11. The system of claim 7, wherein the instructions further cause the system to:

generate a TAI adjacency graph, wherein the TAI adjacency graph defines adjacencies amongst different TAIs within a 5G mobile network, and wherein the TAI adjacency graph is generated based on the uplink NAS transport message, the new message, and previously identified TAI adjacencies.

12. The system of claim 7, wherein the prior TAI and the target TAI are determined based on user location information included in the uplink NAS transport message and the new message.

13. A non-transitory, computer-readable storage medium storing thereon executable instructions that, as a result of being executed by one or more processors of a computer system, cause the computer system to:

receive an uplink non-access stratum (NAS) transport message, wherein the uplink NAS transport message is received through a source base station, and wherein the uplink NAS transport message is associated with a user equipment (UE);

determine a prior Tracking Area Identity (TAI) associated with the UE, wherein the prior TAI is determined based on the uplink NAS transport message;

receive a new message associated with the UE, wherein the new message is received through a target base station, and wherein the new message is received as the UE is transferred from the source base station to the target base station;

determine a target TAI associated with the UE, wherein the target TAI is determined based on the new message;

identify a TAI adjacency graph defining existing TAI adjacencies within a 5G mobile network;

determine an adjacency between the prior TAI and the target TAI based on the uplink NAS transport message and the new message;

determine that the adjacency is absent from, or newly learned with respect to, the TAI adjacency graph to yield a determination;

update the TAI adjacency graph based on the determination; and automatically update a TAI list associated with the UE using updated TAI adjacency, wherein the TAI list is automatically updated to incorporate the prior TAI and the target TAI.

14. The non-transitory, computer-readable storage medium of claim 13, wherein the new message is a path switch request message associated with an Xn handover process.

15. The non-transitory, computer-readable storage medium of claim 13, wherein the new message is a handover acknowledgment associated with an N2 handover process.

16. The non-transitory, computer-readable storage medium of claim 13, wherein the executable instructions further cause the computer system to:

determine a geographic adjacency between the source base station and the target base station, wherein the geographic adjacency is determined based on the uplink NAS transport message and the new message; and use the geographic adjacency to automatically update the TAI list.

17. The non-transitory, computer-readable storage medium of claim 13, wherein the executable instructions further cause the computer system to:

generate a TAI adjacency graph, wherein the TAI adjacency graph defines adjacencies amongst different TAIs within a 5G mobile network, and wherein the TAI adjacency graph is generated based on the uplink NAS transport message, the new message, and previously identified TAI adjacencies.

18. The non-transitory, computer-readable storage medium of claim 13, wherein the prior TAI and the target TAI are determined based on user location information included in the uplink NAS transport message and the new message.

* * * * *